United States Patent
Kettner et al.

(10) Patent No.: US 9,947,132 B2
(45) Date of Patent: Apr. 17, 2018

(54) MATERIAL REPRESENTATION DATA STRUCTURE AND METHOD OF REPRESENTING A MATERIAL FOR DIGITAL IMAGE SYNTHESIS

(71) Applicant: Nvidia Corporation, Santa Clara, CA (US)

(72) Inventors: Lutz Kettner, Berlin (DE); Hakan Andersson, Eskilstuna (SE); Michael Beck, Berlin (DE); Robert Hoedicke, Berlin (DE); Jan Jordan, Berlin (DE); Andy Kopra, Berlin (DE); Steven Parker, Salt Lake City, UT (US); Matthias Raab, Berlin (DE); Daniel Seibert, Berlin (DE); Rajko Yasui-Schoeffel, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 99 days.

(21) Appl. No.: 13/841,016

(22) Filed: Mar. 15, 2013

(65) Prior Publication Data
US 2014/0267340 A1 Sep. 18, 2014

(51) Int. Cl.
G06T 5/00 (2006.01)
G06T 15/50 (2011.01)
G06T 15/04 (2011.01)

(52) U.S. Cl.
CPC ............ *G06T 15/506* (2013.01); *G06T 15/04* (2013.01)

(58) Field of Classification Search
CPC .................................................... G06T 11/001
See application file for complete search history.

(56) References Cited

U.S. PATENT DOCUMENTS

| | | | | |
|---|---|---|---|---|
| 7,952,583 B2* | 5/2011 | Waechter | ................ | G06T 15/06 345/426 |
| 8,451,323 B1* | 5/2013 | Poursohi | ................ | G01B 11/24 348/43 |
| 8,667,404 B2* | 3/2014 | Maillot | ................ | G06F 9/4443 715/762 |
| 8,773,433 B1* | 7/2014 | Smyrl | ................... | G06T 15/506 345/420 |
| 2002/0080136 A1* | 6/2002 | Kouadio | ........................ | 345/426 |
| 2004/0150643 A1* | 8/2004 | Borshukov | ........... | G06T 7/0065 345/426 |

(Continued)

OTHER PUBLICATIONS

G. Ward et al.; "Simulating the Daylight Performance of Complex Fenestration Systems Using Bidirectional Scattering Distribution Functions within Radiance;" Journal of the Illuminating Engineering Soc. of North America, 22 pages; Apr. 2011.*

(Continued)

*Primary Examiner* — Edward Martello (57) ABSTRACT

A material representation data structure and a method of representing a material for digital image synthesis. The data structure may be embodied in a graphics processing subsystem, including: (1) a memory configured to store a material representation data structure according to which a material is declaratively represented by a property indicative of an interaction between the material and light, and (2) a processor operable to gain access to the memory and employ the property in a rendering procedure defined independent of the material representation data structure and designed to effect the interaction.

20 Claims, 7 Drawing Sheets

(56) References Cited

U.S. PATENT DOCUMENTS

| | | | |
|---|---|---|---|
| 2007/0124122 A1* | 5/2007 | Freier | G06T 15/506 |
| | | | 703/2 |
| 2007/0206008 A1* | 9/2007 | Kaufman | G06T 15/06 |
| | | | 345/424 |
| 2009/0153556 A1* | 6/2009 | Nam | G06T 15/06 |
| | | | 345/421 |
| 2010/0122243 A1* | 5/2010 | Breton et al. | 717/163 |
| 2011/0273450 A1* | 11/2011 | Baril | G06T 15/04 |
| | | | 345/426 |

OTHER PUBLICATIONS

Greg Ward; Lawrence Berkeley Laboratory; "The Materials and Geometry Format;" Feb. 1996; 78 pages; Available online at http://w.radiance-online.org/archived/radsite/mgf/mgfdoc.pdf.*

* cited by examiner

MATERIAL REPRESENTATION DATA STRUCTURE AND METHOD OF REPRESENTING A MATERIAL FOR DIGITAL IMAGE SYNTHESIS

TECHNICAL FIELD

This application is directed, in general, to computer graphics and, more specifically, to representing materials for digital image synthesis.

BACKGROUND

Many computer graphic images are created by mathematically modeling the interaction of light with a three dimensional scene from a given viewpoint. This process, called "rendering," generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data. Alternatively, and becoming less prevalent, the CPU can carry out its own rendering, as is the case in many production renderers.

Scene geometry is typically represented by geometric primitives, such as points, lines, polygons (for example, triangles and quadrilaterals), volumes and curved surfaces, defined by one or more two- or three-dimensional vertices. These primitives have material properties that indicate how they interact with light and how they ultimately appear in an image. Material properties include: the color of surfaces, their reflection or refraction properties, light emission of surfaces, scattering and absorption properties of volumes, and even additional geometric properties of surfaces, such as cut-outs, displacements, or bump maps, which are often not modeled in the primary geometric description.

Computer systems often use programming languages and procedural descriptions of material properties to provide the most flexibility in implementing complicated lighting and shading algorithms. The languages used can be general purpose languages, such as C or C++, or domain specific languages commonly referred to as shading languages. To exploit this programmability, applications often define materials with a full procedural description of lighting and shading effects and how they are computed from material parameters, incoming light and other variables. Additionally, applications can include one or more graphics processing subsystem programs, which are executed by the CPU or by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

SUMMARY

One aspect provides a graphics processing subsystem, including: (1) a memory configured to store a material representation data structure according to which a material is declaratively represented by a property indicative of an interaction between the material and light, and (2) a processor operable to gain access to the memory and employ the property in a rendering procedure defined independent of the material representation data structure and designed to effect the interaction.

Another aspect provides method of representing a material in a scene for rendering, including: (1) declaring an instance of the material having a parameter, (2) mapping the instance to a material definition, and (3) employing the parameter in translating the material definition into at least one property, stored in a declarative material representation in memory, that is defined independent of rendering procedures.

Yet another aspect provides a method of rendering a material instance in a scene, including: (1) preprocessing a material definition on which the material instance is based, yielding a declarative material representation, (2) evaluating the declarative material representation, and (3) employing material properties resulting from the evaluating in rendering the material instance.

BRIEF DESCRIPTION

Reference is now made to the following descriptions taken in conjunction with the accompanying drawings, in which.

DETAILED DESCRIPTION

A shading language is a programming language adapted to programming rendering procedures. Shading languages generally fall into one of two categories: those targeting free-programmability of GPUs and those targeting final-frame production renderers. Due to the variety of target markets, a variety of shading languages have been developed, including: GLSL, CgFX, HLSL, RenderMan SL, OSL and MetaSL. Shading languages are useful for programming shaders, which are re-usable programs designed to execute on a GPU for rendering graphics, including volume renderers, particle renderers and global illumination programs.

Shaders and traditional programming languages are often used to procedurally describe materials and their reflective, emissive and transmissive properties with respect to light. Functions can also be implemented in shading or programming languages to describe the spatial distributions of material features, such as texture look-ups, procedural textures and projections.

It is realized herein that materials and their interactions with light are conventionally defined procedurally, making it difficult to optimize execution of the shaders across multiple graphics processing architectures. It is further realized herein that modern shading algorithms, such as importance sampling, multiple importance sampling and bidirectional path tracing, often require mathematical material properties that are difficult, if not impossible, to derive from procedural implementations.

It is realized herein the evolution of graphics processing hardware and rendering algorithms demands a method of representing materials such that materials can be defined physically by their abstract properties, encapsulated, rendered and re-used. It is realized herein an abstract material representation can be strictly descriptive of the physical material and its interactions with light, and independent of the rendering algorithms necessary to render those interactions. The material representation encapsulates various material properties describing the interactions that can be applied to the material during rendering via a generic distribution function. Shading languages represent material properties by complex algorithms that envelope distribution functions and generally lack the encapsulation necessary to combine shading effects, or lack the abstraction necessary for executing modern rendering algorithms. It is realized herein the abstract material representation should be represented declaratively and distinct from rendering procedures generally represented in procedural programming languages or shading languages. The declarative nature of the material representation is amenable to modern computing architectures, because generic rendering procedures can be optimized for any given architecture and need only leverage parameterized material properties.

It is realized herein material properties can be represented by simple constants, real-world measured values or complex analytical models. The material properties are derived from a material definition that is invoked by a user. The user describes a scene by assembling geometric objects that are each assigned some material. Each assigned material is a material instance, through which the user specifies values for parameters of the material. The material definition is invoked when the material instance is mapped to it, and both are translated into the material representation. It is realized herein the parameters presented to the user may not be a direct correlation to material properties in the material representation, but more user-friendly and intuitive parameters that require some translation. Other parameters may map directly to the material representation. It is also realized herein the material definition should include default values for its parameters in the event a material instance does not specify values. For example, if a user invokes a material definition for wood by creating a material instance of wood, the user may elect to specify that the color of the wood is blue. Otherwise, the default color of wood could be red, for instance.

Material instances are generally authored by graphics developers or artists. Material instances are effectively the user invocation of material representations. Material definitions can also be authored by graphics developers, but are more amenable to creation by toolkit and library developers.

In either case, it is realized herein, material definitions are highly programmable. A material definition can assume the parameters of another by incorporating one as a parameter of the other. For instance, a material definition for aluminum could assume the parameters of a material definition for metal. Furthermore, the material definition could also assume the parameters of anodized metal.

An author of a material definition declares, mathematically, how light interacts with the material being described. The interaction itself is later evaluated and then manifest during rendering. The material definition may employ a variety of tools, including bidirectional scattering distribution functions (BSDFs), emissive distribution functions (EDFs), volumetric distribution functions (VDFs), and other functions defined in various programming languages, so long as the other functions are "pure and side-effect-free." Pure and side-effect-free means the function depends only on its arguments and for any given set of arguments there is exactly one possible result. It is realized herein the flexibility of the distribution functions and other functions makes for a powerful and highly programmable material representation that can achieve the most complex effects and interactions with light.

Distribution functions, such as a BSDF, are descriptions of material properties, such as surface properties. It is realized herein that a BSDF, EDF or VDF can be categorized as either an elemental distribution function, modifier distribution function, or a combiner distribution function. For example, an elemental BSDF is such that it does not depend on any other BSDF. These include diffuse, specular, glossy and backscattering glossy BSDFs. Elemental BSDFs can however, rely on additional parameters. A modifier BSDF depends on exactly one other BSDF, the combination of which alters the appearance of the base BSDF. For example, a tint modifier is combined with a base BSDF and uses a color parameter. Other modifier BSDFs include thin film and directional factor BSDFs. A combiner BSDF depends on one or more other BSDFs. For example, a Fresnel layered BSDF is a weighted BSDF where the weight depends on the viewing direction, which allows the creation of the Fresnel effect of specular reflections at certain grazing angles. Other examples of combiner BSDFs include mixed, weighted layered and custom curve layered BSDFs. EDFs and VDFs are likewise categorized.

It is further realized herein that other functions defined in the material definition can be defined in any programming language and are simply compiled and linked into the renderer for evaluation and rendering. The other functions define some procedure by which some aspect, or property, of the material representation is derived from the material definition parameters. One example of such a function is a texture lookup that, given a coordinate, retrieves some property of the texture, color for instance. The texture property can then be used as an input to some other function or perhaps a BSDF, EDF or VDF. Another example would be a function that computes a custom curve for input to a custom curve layered BSDF.

The material definition includes these distribution functions and other functions that are translated into the material representation, which is a declarative representation. During evaluation, functions on which surface properties, volume properties or geometric properties rely are evaluated and their results stored. The material properties of the material representation are the interface to the functions implemented and optimized for the renderer. During rendering, these properties and the distribution functions are used directly by the renderer, at which point the distribution functions are evaluated or sampled. A renderer would either have these functions built in or they would be compiled and linked to the renderer.

Before describing various embodiments of the material definition data structure or method of representing a material for digital image synthesis introduced herein, a computing system within which the data structure or method may be embodied or carried out will be described.

Figure 1:
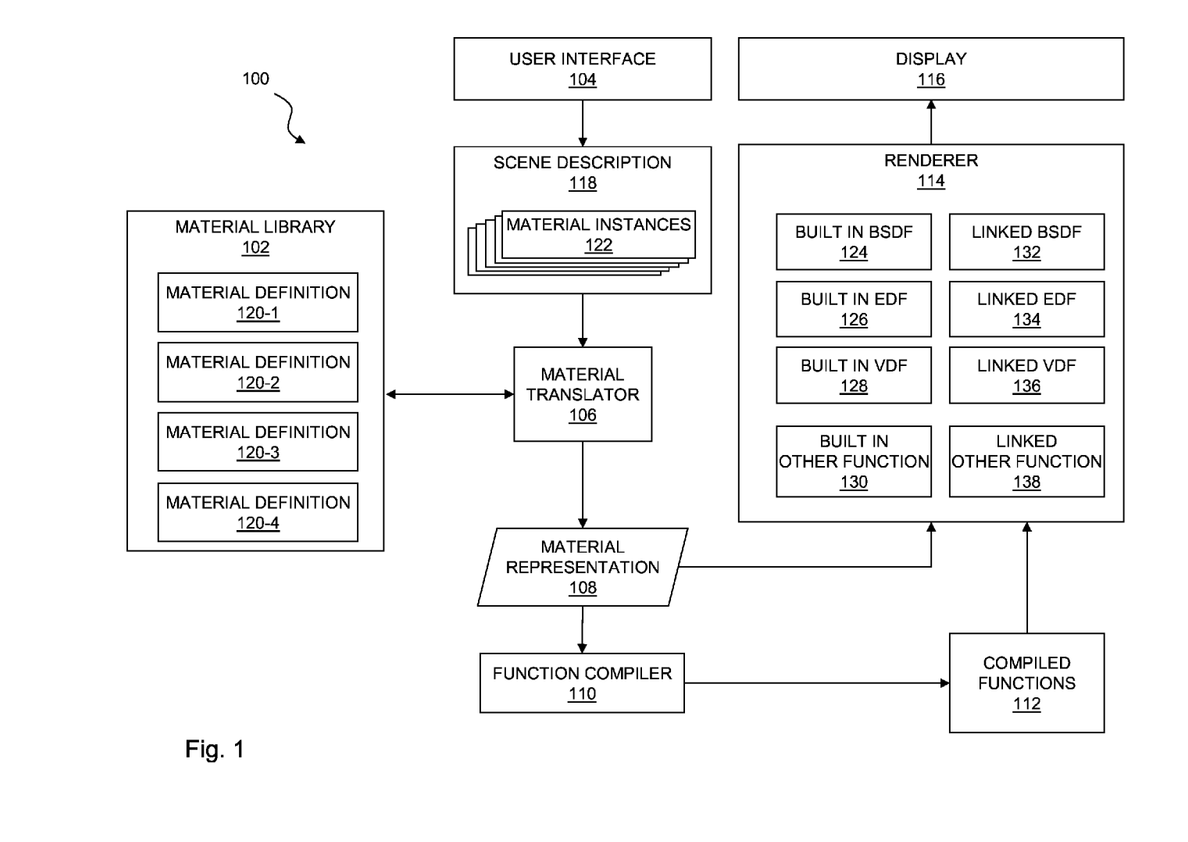
FIG. 1 is a block diagram of one embodiment of a computing system for representing and rendering materials.

FIG. 1 is a block diagram of one embodiment of a computing system 100 in which one or more aspects of the invention may be implemented. The computing system 100 includes a material library 102, a user interface 104, an material translator 106, a function compiler 110, a renderer 114 and a display 116.

Material library 102 contains a variety of pre-made material definitions: material definition 120-1, 120-2, 120-3 and 120-4. In this embodiment, material library 102 comprises four materials, whereas various other embodiments may include any number of materials in the material library. The number of materials is dependent on the user and the application. Materials 120-1 through 120-4 may be part of a family of materials. For example, they may belong to a family of metals. Material 120-1 could be aluminum, material 120-2 could be titanium, material 120-3 could be steel, and material 120-4 could be stainless steel. Hierarchically, each may belong to the "metal family," or, alternatively, material 120-4 (stainless steel) could belong to the "steel family" along with other variants of steel.

In the embodiment of FIG. 1, a user interacts with computing system 100 through user interface 104. User interface 104 may include an application having a graphical user interface that requires input through an input device. Input devices that could be included in user interface 104 include a mouse and keyboard. Alternatively, user interface may include an application and touchscreen interface. User interface 104 may, in certain embodiments, be remotely connected to computing system 100 via a network.

Based on the materials available in material library 102, the user defines a scene description 118 that includes many geometric objects that are each assigned a material. The assigned materials are represented as material instances 122. Each of material instances 122 correlates to and invokes at least one material definition from material library 102. Material instances 122 may also contain values for parameters associated with their respective material definitions.

Material translator 106 combines material instances 122 and their respective material definitions to form a material representation 108. Material translator 106 maps parameters from material instances 122 into their respective material definitions and eventually translates the whole into material representation 108. The translation may be as simple as mapping values for parameters into material representation 108. The translation may also include declaratively defining and combining distribution functions into a property of material representation 108.

Furthermore, properties of material representation 108 may be defined as a result of a function or series of functions, in which case material translator 106 would cause the functions to be compiled and dynamically linked to the renderer for later use. Function compiler 110 compiles these functions into compiled functions 112.

Renderer 114 may be any processor configured for graphics processing, including a GPU or CPU. Renderer 114 includes built in and linked rendering procedures for rendering the user-intended light interactions for the material. In this embodiment, renderer 114 includes a built in BSDF 124, a built in EDF 126, a built in VDF 128 and other built in functions 130. These functions are readily available for material representation 108 to employ. Renderer 114 also includes a linked BSDF 132, a linked EDF 134, a linked VDF 136 and other linked functions 138. Other linked functions 138 include compiled functions 112.

At, or just before rendering, material representation 108 is evaluated to arrive at values for each of the requisite material properties. The evaluation includes evaluating compiled functions 112 to directly calculate a material property or to calculate an input value for a BSDF, EDF or VDF property. Renderer 114 then employs the built in and linked functions to render the scene and display the scene on display 116.

For example, the user could describe a scene having a fog bank through user interface 104. Scene description 118 would include a material instance embodying the fog. The material instance may correlate to a material definition for water, or possibly a material definition for a cloud in material library 102. Material translator 106 would then map parameters defined by the material instance into the material definition, the material definition supplementing those parameters with default values where necessary. Material translator 106 would then translate the material instance and material definition into material representation 108. The properties of material representation 108 may include a VDF to describe the volumetric properties of the fog. Material representation 108 may omit surface properties, such as a BSDF, since the fog has no real surfaces. Material representation 108 may also include other volumetric properties, including absorption and scattering coefficients. Alternatively, material representation 108 may include a function that determines an input to the VDF based on the ambient temperature. This function would be compiled by function compiler 110 and included in compiled functions 112. Compiled functions 112 are then dynamically linked into renderer 114 and renderer 114 proceeds to evaluate material representation and render the fog bank onto display 116.

Having described a computing system within which the data structure or methods introduced herein may be embodied or carried out, various embodiments of the data structure and methods will be described.

Figure 2:
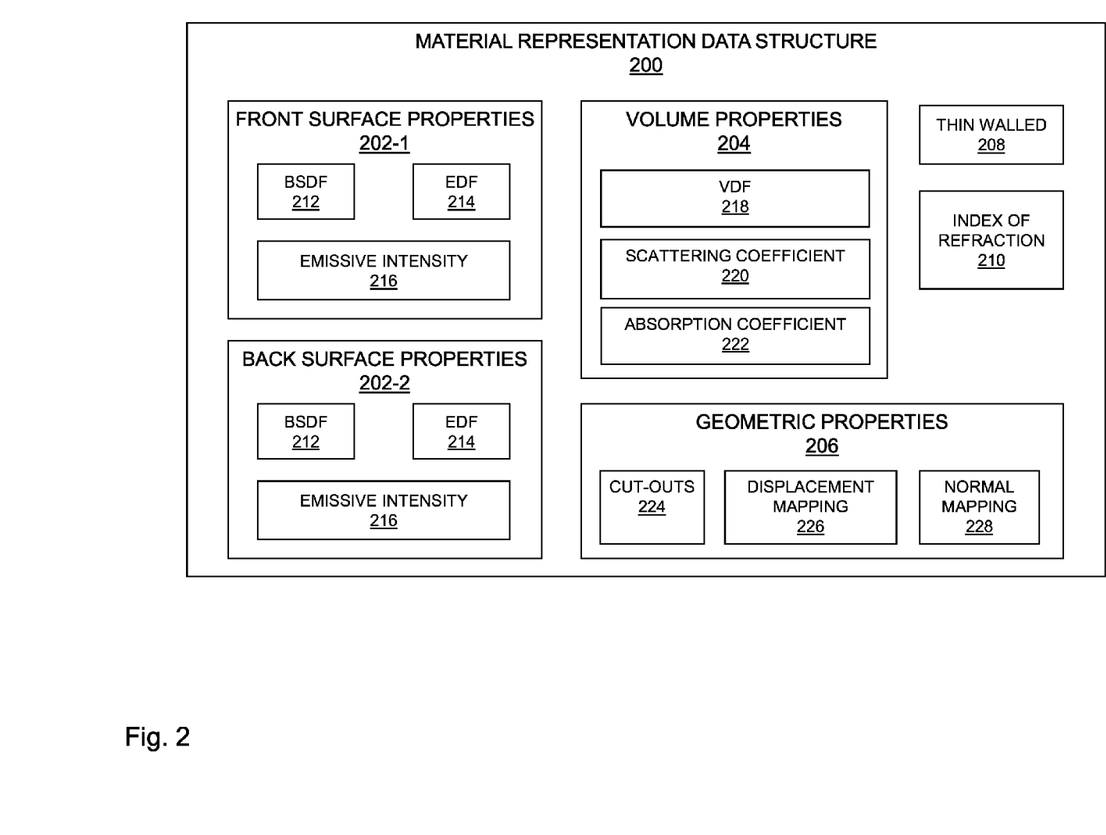
FIG. 2 is a block diagram of one embodiment of a material representation data structure.

FIG. 2 is a block diagram of one embodiment of a material representation data structure 200. Material representation data structure 200 includes a variety of material properties that generally fall into the following categories: surface properties 202, volume properties 204 and geometric properties 206. Additionally, material representation data structure 200 also includes other properties that fall outside these categories, namely a thin walled property 208 and an index of refraction (IOR) 210. A variety of other properties are possible in other embodiments, and can be added to material representation data structure as needed. Depending on the particular object being rendered and the desire of the user, certain material properties are not employed in rendering and need not be defined. For instance, in rendering the fog bank described above for FIG. 1, a fog bank has no distinct surfaces to render, but is better described as a volume that absorbs and scatters incident light. Surface properties 202 are not needed, while volume properties 204 are.

Within the category of surface properties 202, there are front surface properties 202-1 and back surface properties 202-2. The front and back generally contain the same properties, but allow distinct values to be specified for properties of either side of the surface. Those properties include a BSDF 212, an EDF 214 and an emissive intensity 216. Surface properties are rendered via a BSDF in the renderer, such as built in BSDF 124 or linked BSDF 132 of FIG. 1, or via an EDF in the renderer, such as built in EDF 126 for linked EDF 134 of FIG. 1.

Volume properties 204 include a VDF 218, a scattering coefficient 220 and an absorption coefficient 222. These properties describe the light distribution in the volume and are rendered via a VDF, such as built in VDF 122 or linked VDF 136 of FIG. 1.

Geometric properties 206 include cut-outs 224, displacements 226 and normal mapping 228. These properties are often un-modeled in the primary geometric description and are amenable to rendering as material properties.

Figure 3:
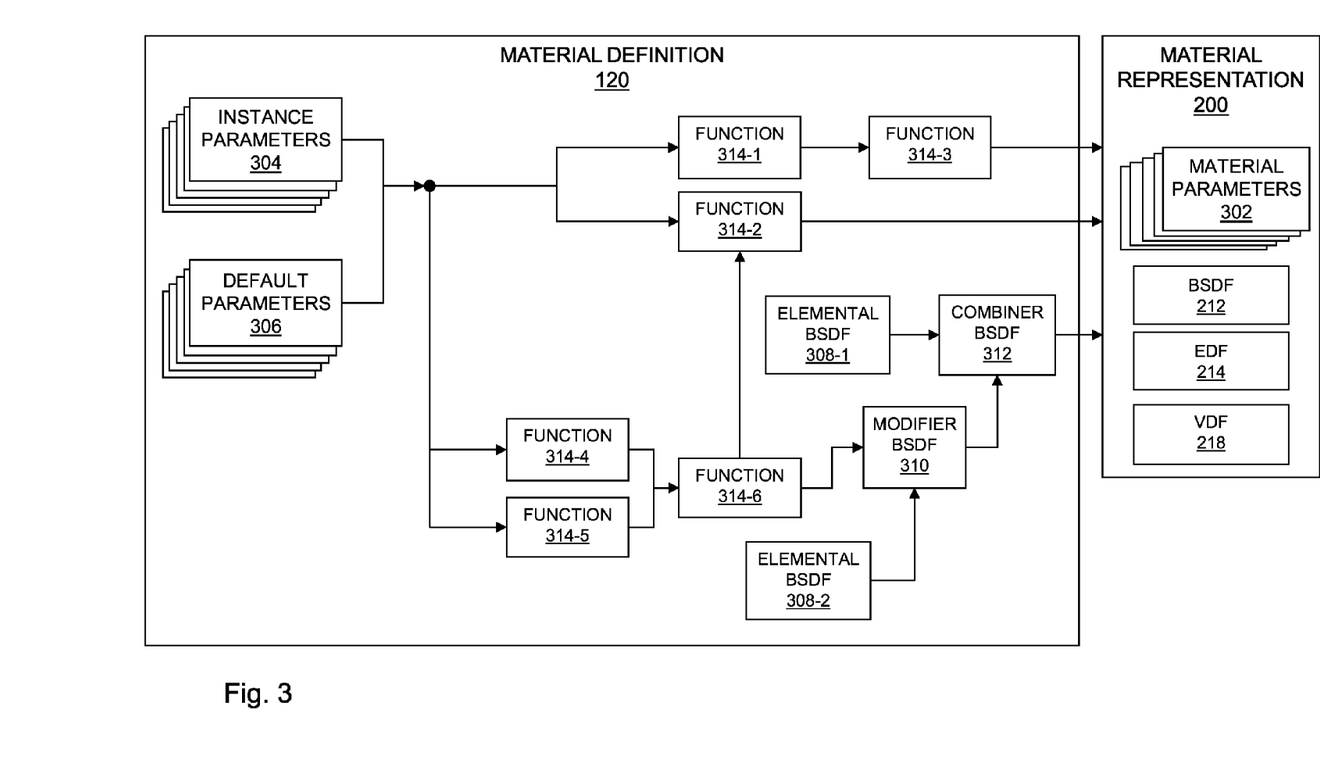
FIG. 3 is a block diagram of one embodiment of a material definition and material representation.

FIG. 3 is a block diagram of one embodiment of material definition 120 of FIG. 1 and material representation 200 of FIG. 2. The structure and declarative nature of material definition 120 and material representation 200 are such that material translator 106, of FIG. 1, and renderer 114, also of FIG. 1, can comprehend the described material before actually executing any of the functions involved. Material definition 120 includes instance parameters 304 and default parameters 306. When a user describes a scene by creating an instance of a material and assigning it to an object in the scene, the user may also specify values for the various parameters of the correlating material definition, such as material definition 120. Otherwise, the user may not specify values for all parameters, which is where default parameters 306 step in. Default parameters 306 are included in the material definition 120 and supplement whatever instance parameters 304 are provided by the user. In alternate embodiments, a user may specify another material definition as a parameter to material definition 120. In that case, material definition 120 could assume the default parameters of the other material definition, or possibly any instance parameters previously specified for the other material definition.

In the embodiment of FIG. 3, material definition 120 also includes a variety of functions 314 and a variety of BSDFs: an elemental BSDF 308-1, another elemental BSDF 308-2, a modifier BSDF 310 and a combiner BSDF 312. The variety of functions 314 are arranged to illustrate the possible uses of functions within material definition 120. The variety of functions 314 may be programmed in any programming language that can be compiled and dynamically linked to the renderer. A function 314-1 and a function 314-3 are coupled in series. Function 314-1 has inputs that are included in instance parameters 304 or default parameters 306. The output of function 314-1 is an input to function 314-3. The output of function 314-3 ultimately appears in material representation 200 as a material property. Similarly, a function 314-2 also has inputs from instance parameters 304 and default parameters 306, and also includes an input from a function 314-6. The output of function 314-2 appears in material representation 200 as a material property. Functions 314-4 and 314-5 each have inputs from instance parameters 304 and default parameters 306, and have outputs that are combined and used in function 314-6. The output of function 314-6 is used in function 314-2, as mentioned above, and is also used as an input to modifier BSDF 310.

Distribution functions may use inputs from instance parameters 304 or default parameters 306, results from the variety of functions 314, and even other distribution functions. Modifier BSDF 310 is a combination of a base BSDF and one modifier, such as a tint or a thin film modifier. Modifier BSDF 310 uses elemental BSDF 308-2 as the base BSDF and the result of function 314-6 as an input to the modifier. Combiner BSDF 312 is uses two distribution functions as input: modifier BSDF 310 and elemental BSDF 308-1. The combined output BSDF appears in material representation 200 as a material property. Alternate embodiments may include combinations of various EDFs and VDFs. The various EDFs and VDFs may be built in to the renderer, or possibly programmed, compiled and linked to the renderer.

Material representation 200 contains various material properties, including: material parameters 302 and the distribution functions of FIG. 2: BSDF 212, EDF 214 and VDF 218.

Figure 4:
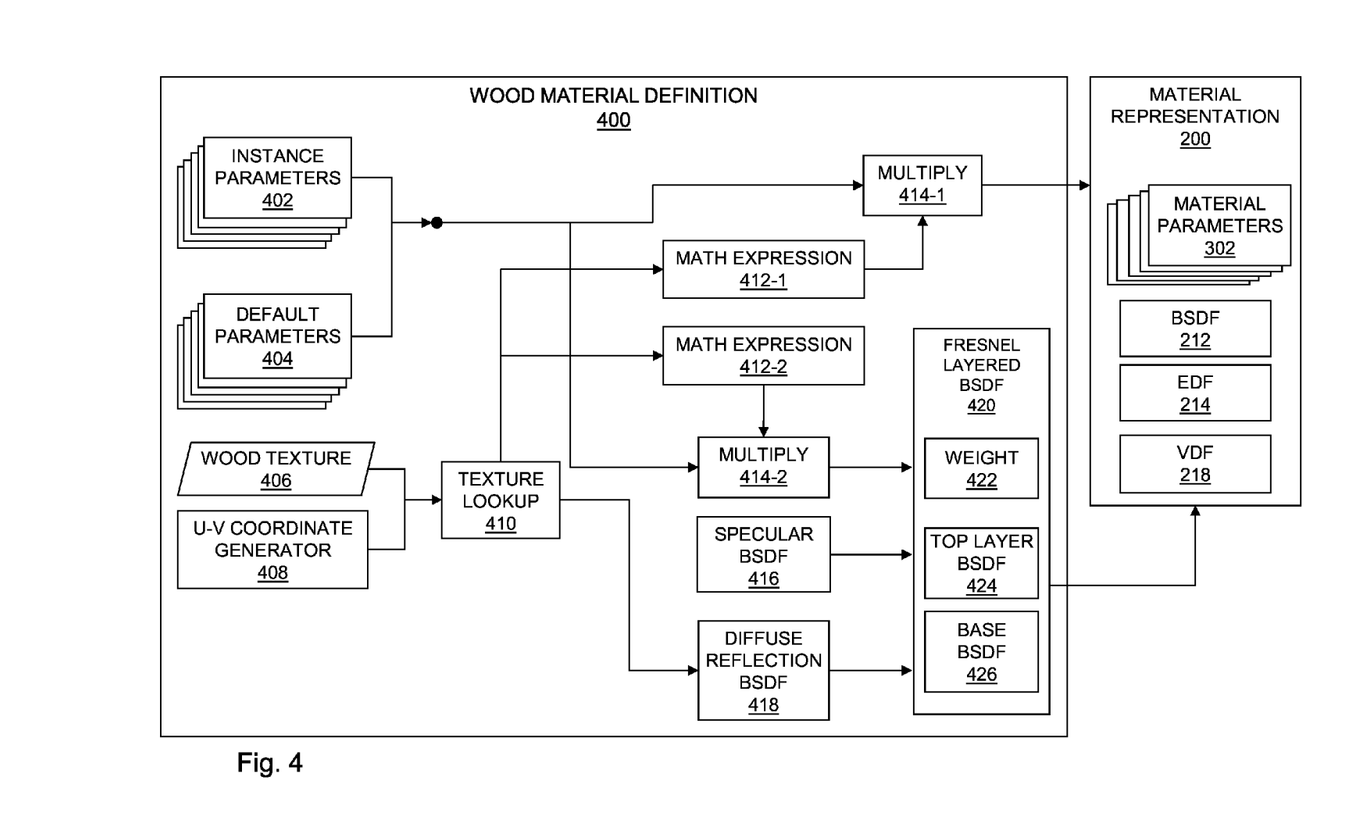
FIG. 4 is a block diagram of another embodiment of a wood material definition and material representation.

FIG. 4 is a block diagram of another embodiment of a material definition 400 and material representation 200 of FIG. 2. Material definition 400 is a material definition for wood. Like material definition 120 of FIG. 3, wood material definition 400 includes instance parameters 402 and default parameters 404. For example, the parameters could include an age parameter that can be specified via a wood material instance. The wood is diffuse and its look changes with age: darkening with age, the lighter parts of the rings erode away faster than the darker, so the wood starts out planar and gains a geometric relief structure over time, and the elevated darker parts become more polished and reflective over time. Additionally, wood material definition 400 includes a wood texture 406, which is a texture data structure for wood. Wood material definition 400 also includes various functions: a U-V coordinate generator 408, a texture lookup 410, math expressions 412-1 and 412-2, multipliers 414-1 and 414-2, and BSDFs: a specular BSDF 416, a diffuse reflection BSDF 418 and a Fresnel layered BSDF 420. Alternate embodiments may also include EDFs and VDFs.

Texture lookup 410, uses U-V coordinate generator 408 to retrieve texture data from wood texture 406. In certain embodiments, texture lookup 410 may be manipulated to implement image scaling, placement or other features. In this embodiment, the texture data is a color value. The texture data is used in math expressions 412-1 and 412-2, and diffuse reflection BSDF 418. Math expression 412-1 operates on the texture data and the result is an input to a multiply 414-1. Multiply 414-1 multiples the result of math expression 412-1 and the age value. The product of multiply 414-1 can be used to displace the geometry, which is to subtract more material in lighter areas over time than in darker areas. The result appears in material representation 200 as a material property.

Math expression 412-2 also operates on the texture data and its result is used in a multiply 414-2. Multiply 414-2, similar to multiply 414-1, multiplies the age value and the result of math expression 412-2 to compute a suitable weight 422 for Fresnel layered BSDF 420. Math expression 412-2 yields an equivalent of darkness which is then multiplied with age. The product of multiply 414-2 is used as an input to Fresnel layered BSDF 420.

Diffuse reflection BSDF 418 is a modifier BSDF and uses the color value from texture lookup 410 as an input to a tint modifier. Specular BSDF 416 is an elemental BSDF that is to be layered on top of diffuse reflection BSDF 418.

Fresnel layered BSDF 420 is a weighted combiner BSDF. As inputs, it uses weight 422, a top layer BSDF 424 and a base BSDF 426. Specular BSDF 416 and diffuse reflection BSDF 418 are the input BSDFs, and the result of multiply 414-2 is used as weight 422. The base is the diffuse reflection effect of diffuse reflection BSDF 418. The weight of the Fresnel layered BSDF starts at zero and increases over time, fading in the effect of specular BSDF 416 in an angle dependent manner according to the Fresnel effect, and getting stronger in the darker areas than in the lighter. The resulting combined BSDF appears in material representation 200 as a material property, specifically, BSDF 212.

Figure 5:
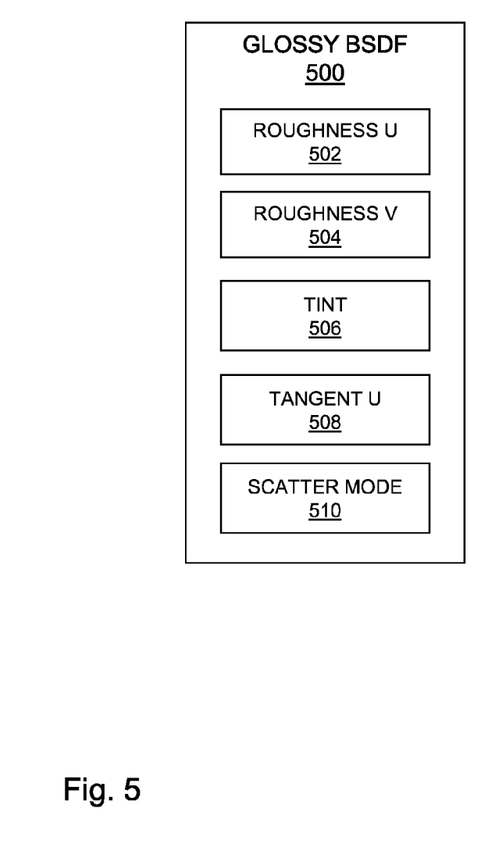
FIG. 5 is a block diagram of one embodiment of an elemental bidirectional scattering distribution function (BSDF)

FIG. 5 is a block diagram of one embodiment of an elemental BSDF, a glossy BSDF 500. Glossy BSDF 500 includes five parameters: a U-roughness 502, a V-roughness 504, a tint 506, a U-tangent 508 and a scatter mode 510.

Figure 6:
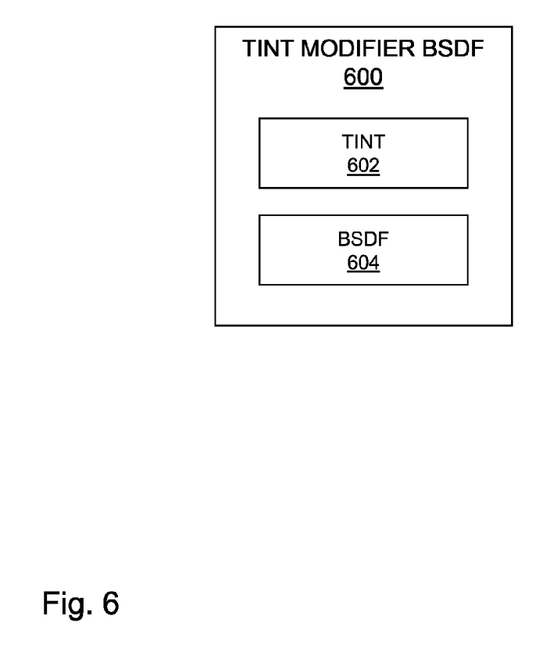
FIG. 6 is a block diagram of one embodiment of a modifier BSDF.

FIG. 6 is a block diagram of one embodiment of a modifier BSDF, a tint modifier BSDF 600, or simply tint BSDF 600. Tint BSDF 600 includes a base BSDF 604 and a tint parameter 602.

Figure 7:
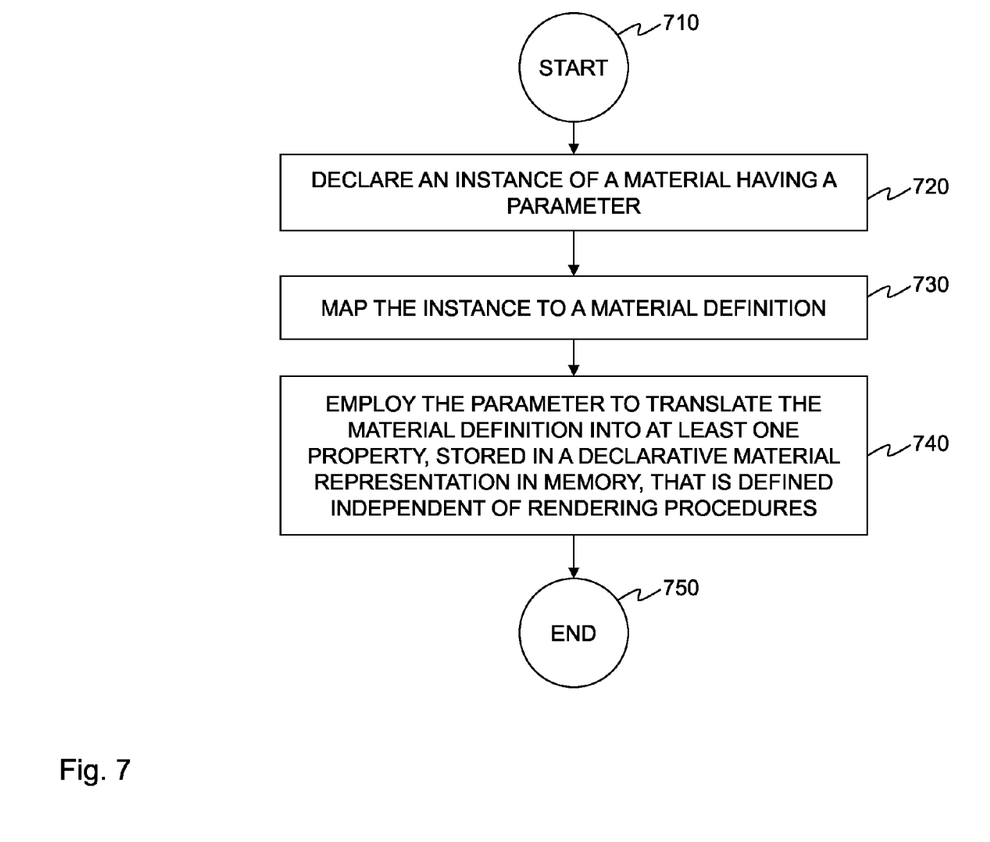
FIG. 7. is a flow diagram of one embodiment of a method for representing a material in a scene for rendering.

FIG. 7 is a flow diagram of a method for representing a material in a scene for rendering. The method begins at a start step 710. At a step 720, a material instance is declared. The material instance includes a parameter. Alternate embodiments may include many parameters in a material instance, depending on the application and user. The material instance is mapped to a material definition at a step 730. Mapping the instance includes recognizing whatever parameters are provided for in the material instance and supplementing those with default parameters in the material definition. At a step 740, a translator employs the parameter to translate the material definition into a declarative material representation having at least one material property. The material representation is stored in memory for later use. The declarative nature of the material representation is such that it is independent of any rendering procedures defined in or linked to the renderer. Translation may include deriving the material property via one or more functions defined in the material definition. Functions may be programmed in any programming language, including C, C++, and possibly shading languages. Functions are compiled and dynamically linked to a renderer. They are executed later during an evaluation and rendering stage. Translating may also include combining one or more distribution functions into a single generic distribution function that is later evaluated during rendering. The translation may result in a variety of material properties that generally fall into the following categories: surface properties, volume properties, geometry properties and other material parameters. The method ends at a step 750.

Figure 8:
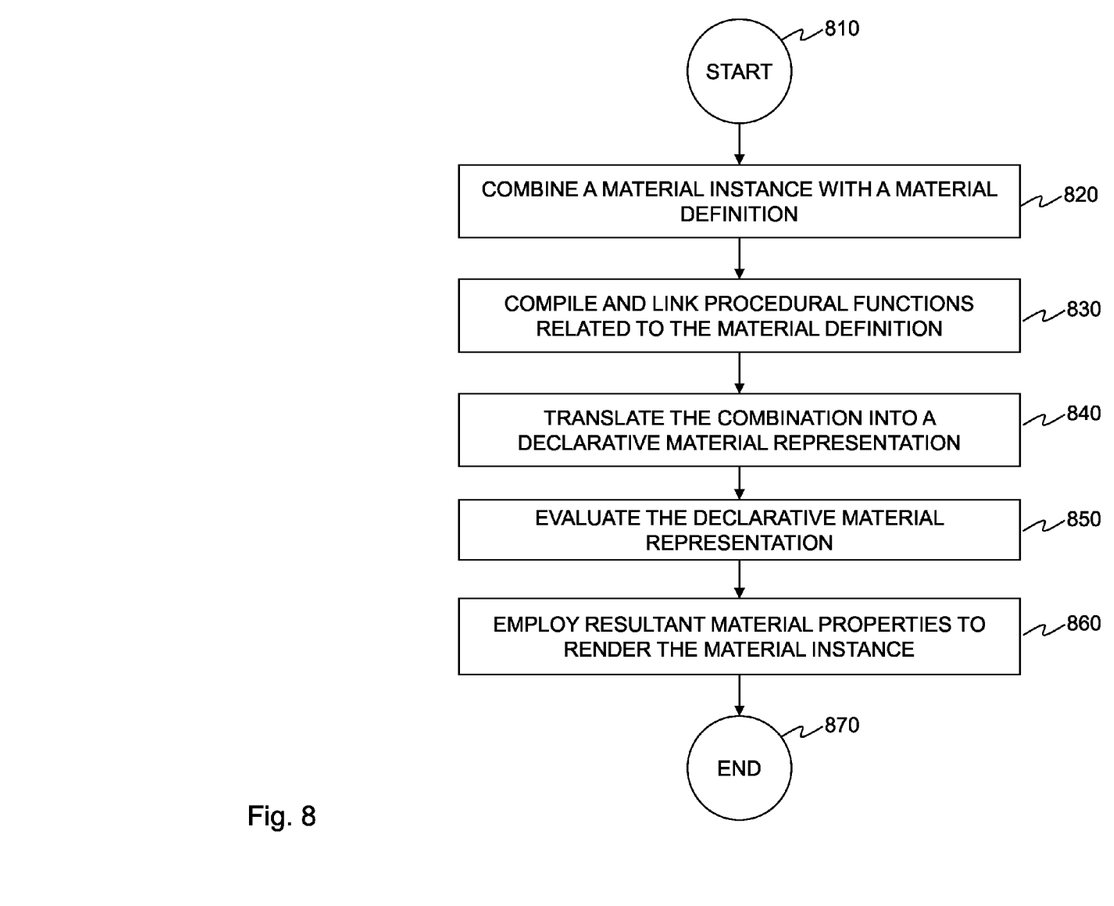
FIG. 8 is a flow diagram of one embodiment of a method for rendering a material instance in a scene.

FIG. 8 is a flow diagram of one embodiment of a method of rendering a material instance in a scene. The method begins at a start step 810. At a step 820 the material instance is combined with a correlating material definition. The scene can and typically does include multiple material instances. Parameters in the material definition are assigned values from the material instance or from a set of default values for the material definition. Any functions used by or defined within the material definition are compiled and dynamically linked to the renderer at a step 830. The combination of the material instance and material definition are translated at a step 840 into a declarative material representation. The declarative material representation is evaluated at a step 850 to arrive at values for the surface, volume and geometric properties. These material properties, along with any distribution functions defined in the material definition are then used directly by the renderer to render the material instance.

Those skilled in the art to which this application relates will appreciate that other and further additions, deletions, substitutions and modifications may be made to the described embodiments.

What is claimed is:

1. A graphics processing subsystem, comprising:
a memory configured to store at least one declarative material representation having a property indicative of an interaction between a material and light;
a material translator configured to form said declarative material representation by combining a material instance with a material definition that mathematically defines said interaction between said material and light; and
a processor operable to gain access to said memory and directly use said property of said material representation in a rendering procedure that is designed to effect said interaction.

2. The graphics processing subsystem recited in claim 1 wherein said property is a built-in BSDF.

3. The graphics processing subsystem recited in claim 1 wherein said rendering procedure is global illumination.

4. The graphics processing subsystem recited in claim 1 wherein said property is procedurally derived from said material definition having parameters specified by a user via said material instance.

5. The graphics processing subsystem recited in claim 1 wherein said rendering procedure represents a procedural programming language.

6. The graphics processing subsystem recited in claim 4 wherein said memory is further configured to store a material library having multiple material definitions respectively representing a plurality of materials, said multiple material definitions having configurable default values to supplement respective user specified parameters.

7. The graphics processing subsystem recited in claim 1 wherein said material definition includes distribution functions that describe properties indicative of interactions between said material and light and said material translator is configured to translate said distribution functions to form said declarative material representation.

8. A method of representing a material in a scene for rendering, comprising:
declaring an instance of said material having a parameter;
mapping said instance to a material definition that mathematically defines an interaction between said material and light;
translating said material definition, employing said parameter, into a declarative material representation represented by a property indicative of said interaction between said material and light, wherein said translating includes deriving a value for said property via at least one function; and
storing said declarative material representation in a memory, wherein said property of said declarative material representation is used directly by a renderer in rendering procedures that render said interactions.

9. The method recited in claim 8 wherein said property falls into a category selected from the group consisting of:
surface properties;
volume properties;
geometric properties; and
material parameters.

10. The method recited in claim 8 wherein said at least one function is evaluated by said renderer.

11. The method recited in claim 10 wherein said deriving includes employing said parameter in combining a plurality of BSDFs into a single BSDF property that is subsequently evaluated and employed in scene rendering.

12. The method recited in claim 10 wherein said translating further includes compiling said at least one function for subsequent material evaluation and scene rendering.

13. The method recited in claim 8 further comprising compiling said declarative material representation into instructions executable by a rendering processor.

14. The method recited in claim 8 further comprising:
representing said declarative material representation by a declarative material definition language; and
representing said rendering procedures by a procedural language.

15. A method of rendering a material instance in a scene, comprising:
generating a declarative material representation for a material by combining a material definition with a material instance and translating the resulting combination, wherein said material definition mathematically defines an interaction between said material and light;
evaluating said declarative material representation to determine values for material properties of said material representation indicative of said interaction between said material and light; and
directly employing said values of said material properties resulting from said evaluating in rendering of said material instance.

16. The method recited in claim 15 further comprising describing said scene as a plurality of material instances.

17. The method recited in claim 15 wherein said employing includes directly employing said values and distribution functions defined in said material definition.

18. The method recited in claim 17 further comprising compiling and linking procedural functions related to said material definition.

19. The method recited in claim 15 wherein said material properties include a distribution function and said employing includes evaluating said distribution function.

20. The method recited in claim 15 wherein said evaluating includes evaluating a procedural function, defined in said material definition, that employs a parameter of said material definition in at least partially defining a material property.

* * * * *